United States Patent Office 3,486,968
Patented Dec. 30, 1969

3,486,968
MICROPOROUS POLYURETHANE COATINGS
AND FILMS
Charles E. Mater, Buena Vista, Va., assignor to Reeves
Brothers, Inc., a corporation of New York
No Drawing. Continuation of application Ser. No.
331,951, Dec. 19, 1963. This application Oct. 12,
1967, Ser. No. 677,499
Int. Cl. B32b 27/40, 5/18, 31/14
U.S. Cl. 161—190                        12 Claims

ABSTRACT OF THE DISCLOSURE

Microporous coatings and films and, more particularly, coating compositions of certain microporous polyurethane systems which are particularly suitable for the production of rainwear and other water-resistant fabrics, simulated leathers, microporous membranes and for other microporous coating applications. The microporous polyurethane systems are produced by dispersing particles of a solid pore-forming material in a polyurethane film and treating the resultant film with a liquid which is capable of dissolving the pore-forming materials.

---

This application is a continuation of application Ser. No. 331,951, filed Dec. 19, 1963, and now abandoned.

Polymer systems with microporous or microporomeric structures usually exhibit permeability to moisture or water vapor, the common designation of which phenomenon is termed "breathability," while resisting the pasage of water through the numerous micropores distributed throughout the polymer. Because of the breathability of these microporous polymer systems, fabrics which are coated with or laminated to films of such microporous polymer systems may be worn without the discomfort which is usually associated with water-resistant or water-repellant fabric materials which are impermeable to moisture or water vapor. Although many types of elastomers and other polymer systems have been made with microporomeric or microporous structures (the terms "microporomeric" and "microporous" being interchangeable), it is very difficult to form micropores in polyurethane polymer systems containing polyurethane resins while retaining the unique physical and chemical properties for which polyurethanes are known. Moreover, such microporous polyurethane resins as are known have been prepared by methods which militate against their use either as coating compositions or in water-resistant, water vapor-permeable films and fabric materials.

Using a technique by which solid pore-forming materials having an average particle size not greater than 100 mesh (Tyler standard) are uniformly dispersed throughout a polyurethane system and the pore-former subsequently leached out of the resultant polyurethane dispersion by a liquid which is a solvent for the pore-forming material but which does not materially affect the polymer, I have found that it is possible to form a microporous polyurethane system having a poromeric structure such that thin films of these microporomeric polyurethanes exhibit excellent water vapor transmission and other hydrostatic properties, as well as retaining the high abrasion resistance, outstanding flexibility and aging characteristics, and the oil and solvent resistance of the polymer. The particular poromeric cell formation which is achieved by using this technique gives the films of these microporous polyurethane systems a very "soft" appearance and feel which is highly desirable. By way of illustration, a thin film (ca. 0.5 to 5 mils) of the microporous polyurethane system produced by this technique is characterized by a Suter Test value not less than 40 cm., a water vapor transmission not less than 30 gms./hr./m.$^2$, and an Impact Spray Test value not greater than 1 gm., which hydrostatic properties, when considered in conjunction with the unique appearance and physical "feel" of these microporous polyurethane systems, have not been achieved with any microporous polymer systems or microporous rubber which are presently available. Because of their excellent hydrostatic properties and physical appearance, these microporous polyurethane systems may be used in the production of rainwear and other water-resistant fabrics, simulated leathers, microporous membranes and for other microporous coating applications.

Based on these discoveries, the invention provides an improved coating composition which is particularly suitable for use in the production of rainwear and other water-resistant fabrics (simulated leathers, microporous membranes and for other microporous coating applications and which consists essentially of a normally solid, film-forming, microporous polyurethane system having a poromeric structure such that a thin film thereof is characterized by (i) a Suter Test value (as measured by ASTM D 583–54–21) not less than 40 cm., (ii) a Water Vapor Transmission value (as measured by ASTM E 96–53T–B) not less than 30 gms./hr./m.$^2$, and (iii) an Impact Spray Test value (as measured by ASTM D 583–54–15) not greater than 1 gm.

Selection of a suitable polyurethane resin for use in the preparation of these microporous polyurethane systems, from which, in turn, the coatings, films and fabric materials of the invention are derived, may be made from those film-forming polyurethanes which are prepared from either polyesters or polyethers (or both) and which possess the requisite physical properties, such as abrasion resistance and tensile strength. By way of illustration, two elastomeric polyurethanes which have been found to be particularly satisfactory in producing the microporous coatings, films and fabric materials of the invention are the "Estane" polyurethanes manufactured by B. F. Goodrich Chemical Company and the "Texin" polyurethanes manufactured by Mobay Chemical Company.

Although these polyurethane resins are normally solid and preferably elastomeric, liquid prepolymer resins may be used in the initial stages of preparation, provided, however, that such prepolymers are capable of being cured in the presence of the pore-forming material to a normally solid, film-forming polyurethane. Moreover, the basic polymer system which is to be made microporomeric may contain polyurethane as the sole polymer in the system or it may contain a blended mixture of polyurethane and one or more compatible resins, such as polyvinyl chloride, which, like the polyurethanes, are materially unaffected by the liquid used to leach out the pore-former. To the polyurethane or polyurethane-polyvinyl chloride mixture may be added fillers, coloring material or processing aids which are the normal components of any polymer system. As used herein, the term "polyurethane system" embraces film-forming polyurethanes prepared from polyesters or polyethers (or both), as well as polymer resin mixtures which contain not less than about 30 percent by weight of such polyurethanes, together with any fillers, coloring material and processing aids which may be present.

The pore-forming material used in the preparation of the microporous polyurethane system by the aforementioned technique must be substantially insoluble in the polyurethane system or in a solution of the polyurethane system, yet must be capable of being extracted from the polyurethane system (in which it has been dispersed) by a liquid in which it is soluble but which does not materially affect (i.e., dissolve) the polyurethane system. To achieve the proper degree of microporosity, the pore-forming material should be fine (not greater than 100 mesh), uniformly small solid which does not change its form during the processing steps involved in the method. For most purposes, even a finer pore-forming material, preferably one which passes through a 325 mesh screen, is desirable. Typical amongst the pore-forming materials which have been used with success are various salts, such as sodium chloride and magnesium sulfate.

The amount of pore-forming material used, of course, is dependent upon the end properties desired in the microporous polyurethane system. For most purposes, I prefer to use from about 1 to about 5 parts by weight of pore-forming material per part by weight of the polyurethane resin. When such concentrations of pore-forming material are uniformly dispersed through the polyurethane system and subsequently leached out with a liquid which dissolves the pore-former but which has no materially adverse effect on the resin, the appearance of a thin film of the resultant microporous polyurethane system under magnifications of from $50\times$ to $100\times$ is that of tiny ellipsoidal (or egg-like) capsules with interconnecting passages. This unusual cellular structure, which is obtained no matter what type of solid pore-forming material is used as long as the solid pore-forming material has an average particle size not larger than 100 mesh, gives the film or coating a very soft appearance and "feel" which is highly desirable.

The water-resistance of the microporous polyurethane coating composition is closely related to the hydrophobic characteristics of the polymer, for if the polymer is somewhat hydrophilic because of its chemical structure, the surface micropores or cells of the microporous polyurethane are quickly wet and its hydrostatic properties are diminished. This "wetting" is especially pronounced when a fabric material containing a thin film of the microporous coating composition is subjected to repeated dry cleaning or washing operations, both of which leave a residue of wetting agents.

Because polyurethanes are somewhat hydrophilic by nature, and therefore susceptible to the retention of wetting agents, it has been found desirable to make the micropores (or cells) more hydrophobic for those applications where the microporous coating is to be subjected to cleaning soaps or other wetting agents. The most practical method I have found to increase the hydrophobicity of the microporous polyurethane system is to impregnate it with a solution of a hydrophobic compound, such as a cross-linkable silicone oil. When such hydrophobic compounds are properly applied to the microporous polyurethane system, it is possible to improve the hydrostatic properties of the microporomeric structure and, perhaps even more significantly, to retain such improved hydrostatic properties even after repeated washing or dry cleaning with strong wetting agents. This technique has been found to be particularly useful for the production of rainwear fabric materials from the microporous polyurethane coatings of the invention.

To prepare microporous polyurethane coating compositions in accordance with the invention, or to obtain such microporomeric structures in situ during the production of unsupported films and fabric materials (which may be regarded as fiber-reinforced films), the components of the polyurethane system together with the solid pore-forming material may be formulated by standard milling techniques common to elastomeric mixing procedures. For example, a common two-roll mill may be used for adding fillers, colors, processing aids and the pore-former to the polyurethane. After a homogeneous mixture has been formed, resulting in the pore-forming material being uniformly dispersed throughout the polyurethane system, the mixture may be calendered or extruded, or alternatively, placed into solution and then coated, either onto a substrate or onto a surface on which it forms a film. Nextly, the pore-forming material is removed from the polyurethane system by leaching with a liquid in which the pore-former is soluble but which does not materially affect the polymer, and the resultant microporous structure dried.

To produce water-resistant, water vapor-permeable fabric materials, the homogeneous mixture (or solution) of the polyurethane system and the pore-former is coated onto a fabric, which may be either woven or nonwoven and contain either synthetic or natural fibers or both, so that polymer system (containing the pore-forming material) forms a thin film over substantially the entire face of the fabric. Treatment of the film-coated fabric with a liquid which is capable of dissolving the solid pore-forming material from the film coating while not materially affecting the polyurethane system converts the polyurethane film which adheres (and is probably bonded) to the fabric into a microporous polyurethane film, thereby forming a water-resistant, water vapor-permeable fabric material. Alternatively, the fabric material may be produced by laminating a thin (ca. 0.5 to 5 mils) unsupported film of the microporous polyurethane system to the fabric so that the film is bonded over substantially the entire face of the fabric. To further improve the hydrostatic properties of the fabric material, whether it is in the form of a film-coated or film laminated fabric, the material may be impregnated with a hydrophobic compound, such as a cross-linkable silicone oil, using a padder for the impregnation.

The hydrostatic properties of the unsupported microporous films or of the film-coated or film-laminated fabrics are generally characterized by three tests, namely (i) the Suter Test, which is measured by ASTM D 583–54–21, (ii) the Water Vapor Transmission value, which is measured by ASTM E 96–53T–B, and (iii) the Impact Spray Test, which is measured by ASTM D 583–54–15. Because of their unique poromeric structure, which appears under magnifications of $50\times$ to $100\times$ as tiny ellipsoidal capsules with interconnecting passages, a thin unsupported film of the microporous polyurethane system of the invention, as well as the film-coated and film-laminated fabrics, are characterized by a Suter Test value not less than 40 cm., and preferably in the range from about 40 to about 140 cm., a Water Vapor Transmission value not less than 30 gms./hr./m.$^2$, and preferably in the range from about 30 to about 100 gms./hr./m.$^2$, and an Impact Spray Test value from 0 to 1 gm. These films and fabric materials possess outstanding breathability and high hydrostatic characteristics, high abrasion resistance, a very desirable feel and appearance, and are completely washable and dry cleanable. These products have been found useful for rainwear applications, baby pants, artificial or simulated leather, porous membranes and for similar coating applications.

The following examples are illustrative of the ease with which microporous polyurethane coatings, films and fabric materials may be prepared in accordance with the invention.

In each of these examples, the microporous polyurethane system was prepared from a polyester-derived polyurethane elastomer designated as Estane 5740X1, manufactured by B. F. Goodrich Chemical Company, which polyurethane elastomer is characterized by a hardness of 88 Shore A, a tensile strength of 5800 p.s.i., an elongation of 540%, a tensile modulus of 1400 p.s.i. at 300%, a compression set of 39% at 25° C. (22 hours), and a specific gravity of 1.2.

EXAMPLE I

Using a two-roll mill, a polyurethane system was formulated by uniformly blending 100 parts by weight of polyurethane (Estane 5740X1), 2 parts by weight of cadmium stearate, 30 parts by weight of titanium dioxide, and 0.1 part by weight of ultramarine blue. The blended polyurethane system was then dissolved in a solvent (such as tetrahydrofuran or dimethyl formamide), 300 parts by weight of 325 mesh sodium chloride were added to the solution, and the resultant dispersion coated on nylon fabric (8 oz./sq. yd.). After drying, the salt was leached from the polymer system in a water bath, and the resultant film-coated nylon material dried. The film-coated nylon was then impregnated with a silicone solution consisting of 100 parts by weight of water, 8 parts by weight of silicone oil (Dow-Corning ET-5317), and 2 parts by weight of a cross-linking catalyst (Catalyst 62), and then dried and cured. The resultant film-coated nylon was water-resistant and water vapor-permeable, and has been found particularly suitable for use in baby pants. The following table sets forth the properties of this fabric material.

Property:
  Fabric weight, uncoated (oz./sq. yd.) _____ 0.8
  Fabric weight, coated (oz./sq. yd.) _____ 2.3
  Suter Test (cm.) _____ 140
  WVT (gms./hr./m.$^2$) _____ 43
  Impact spray test (gm.) _____ 0
  After 10 washings (AATCC No. 61)—
    Suter Test (cm.) _____ 140
    Impact Spray (gm.) _____ 0

EXAMPLE II

Using the identical technique described in Example I, a thin film of a polyurethane dispersion having the following composition was applied to nylon taffeta:

Component:                          Parts by weight
  Polyurethane (Estane 5740X1) _____ 100.0
  Cadmium stearate _____   2.0
  Clay _____  20.0
  Carbon black _____   2.0
  Watching red _____   0.7
  Blue pigment _____   3.0
  Phenolic resin _____  10.0
  325 mesh NaCl _____ 500.0

After the film-coated nylon was dried, the salt was leached from the polyurethane film in a water bath, and the coated fabric dried once again. The microporous coated nylon was divided into two parts, one of which was impregnated with the silicone solution described in Example I under identical conditions. The following table sets forth the hydrostatic properties of both the silicone-impregnated and non-impregnated microporous film-coated fabric:

| Property | Silicone impregnated | Non-impregnated |
| --- | --- | --- |
| Fabric weight, uncoated (oz./sq. yd.) | 2.7 | 2.7 |
| Fabric weight, coated (oz./sq. yd.) | 3.5 | 3.5 |
| Suter Test (cm.) | 140 | 110 |
| WVT (gms./hr./m$^2$) | 55 | 62 |
| Impact spray test (gm.) | 0 | 0 |
| After washing (AATCC No. 61): | | |
| Suter test (cm.) | 80 | 40 |
| Impact spray (gm.) | 0.3 | ca. 1 |
| After dry cleaning (AATCC No. 86): | | |
| Suter test (cm.) | 90 | 10 |
| Impact spray (gm.) | 0.2 | ca. 1 |

EXAMPLE III

The following components were homogeneously blended together on a two-roll mill:

Component:                          Parts by weight
  Polyurethane (Estane 5740X1) _____ 100
  Cadmium stearate _____   2
  Titanium dioxide _____  10

The resultant polyurethane system was dissolved in tetrahydrofuran to 30 percent total solids, and then 150 parts by weight of 200 mesh salt (NaCl) were added, based on the weight of the polymer. The cement was then knife-coated on a 3.7 oz./sq. yd. cotton-Dacron fabric and the film-coated fabric leached with water. After drying, the coating exhibited a water vapor transmission of 32 gms./hr./m.$^2$ and a Suter Test value of 100 cm.

EXAMPLE IV

A microporous polyurethane system was prepared identical to that described in Example III, except that 500 parts by weight of 200 mesh salt (NaCl) were used. The coated fabric (after leaching) weighed 3.8 oz./sq. yd., and exhibited a water vapor transmission of 104 gms./hr./m.$^2$ and a Suter Test value of 104 cm. The film-coated fabric was particularly satisfactory for gloves, and could be made to simulate kid leather.

EXAMPLE V

A microporous polyurethane system was prepared identical to that described in Example III, again using 150 parts by weight of 200 mesh salt (NaCl), except that the film was coated onto a dacot (1.8 oz./sq. yd.). The film-coated dacot exhibited a water vapor transmission of 40 gms./hr./m.$^2$ and a Suter Test value of 67 cm. Even when the film was embossed prior to leaching with water, very little detail was lost.

EXAMPLE VI

A microporous polyurethane system was prepared identical to that of Example III, except that 400 parts by weight (based on the weight of the polyurethane) were used. The polymer system was coated on 2.7 oz./sq. yd. nylon taffeta so that the leached film-coated fabric weighed 3.9 oz./sq. yd. after drying. The film-coated nylon fabric was water-resistant and water vapor-permeable, exhibiting a water vapor transmission of 70 gms./hr./m.$^2$ and a Suter Test value of 110 cm.

Although the foregoing examples demonstrate the feasibility of producing water-resistant and water vapor-permeable fabric materials in accordance with the invention, the microporous polyurethane coatings may also be formed into unsupported films of thicknesses ranging from about 0.5 to about 5 mils, or even to thicknesses represented by 5 to 6 oz./sq. yd., at which latter thicknesses the material is very similar in appearance to suede leather. These unsupported films (or sheets) may be used by themselves for various industrial purposes, especially where dry cleaning properties are desired, or may be used to produce water-resistant, water vapor-permeable fabric materials by lamination of the film to the fabric. Similarly, coating compositions consisting essentially of these microporous polyurethane systems may be used for any microporous coating application where it is necessary or desirable to utilize the unique microporomeric structures which characterize these systems, coupled with the chemical and physical properties of polyurethane.

I claim:
1. An unsupported film of a microporous thermoplastic polyurethane having a thickness in the range from about 0.5 to about 5 mils and characterized by (i) a Suter Test value (as measured by ASTM D 583–54–21) not less than 40 cm., (ii) a Water Vapor Transmission value (as measured by ASTM E 96–53T–B) not less than 30 gms./hr./m.$^2$, and (iii) an Impact Spray Test value (as measured by ASTM D 583–54–15) not greater than 1 gm., the unsupported film being formed by (a) uniformly dispersing from about 1 to about 5 parts by weight of a solid pore-forming material having an average particle size in the range from about 325 mesh to about 100 mesh (Tyler standard) in 1 part by weight of a film-forming polyurethane system, (b) forming the resultant dispersion into a film having a thickness from about 0.5 to about 5 mils, and (c) treating the resultant film with a liquid which is capable of dissolving the pore-forming material while not materially affecting the polyurethane system.

2. A water resistant, water vapor-permeable fabric material comprising a fabric selected from the group consisting of woven and nonwoven fabrics, and a thin substantially continuous film of a microporous thermoplastic polyurethane system bonded to the fabric over substantially its entire face, the fabric material being characterized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm., the fabric material being formed by (a) uniformly dispersing from about 1 to about 5 parts by weight of a solid pore-forming material having an average particle size not larger than 100 mesh (Tyler standard) in 1 part by weight of a film-forming polyurethane system, (b) coating a fabric selected from the group consisting of woven and non-woven fabrics over substantially its entire face with a thin film of the resultant polyurethane dispersion, and (c) treating the film-coated fabric with a liquid which is capable of dissolving the solid pore-forming material from the film coating while not materially affecting the polyurethane system, thereby converting the polyurethane film which adheres to the fabric into a microporous polyurethane film.

3. A water-resistant, water vapor-permeable fabric material comprising a fabric selected from the group consisting of woven and nonwoven fabrics, a thin substantially continuous film of a microporous thermoplastic polyurethane system bonded to the fabric over substantially its entire face, and a hydrophobic residuum adhering to the microporous polyurethane film and remaining after impregnation of the film and fabric with a cross-linkable silicone oil, the fabric material being characerized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm., the fabric material being formed by (a) uniformly dispersing from about 1 to about 5 parts by weight of a solid pore-forming material having an average particle size not larger than 100 mesh (Tyler standard) in 1 part by weight of a film-forming polyurethane system, (b) coating a fabric selected from the group consisting of woven and non-woven fabrics over substantially its entire face with a thin film of the resultant polyurethane dispersion, and (c) treating the film-coated fabric with a liquid which is capable of dissolving the solid pore-forming material from the film coating while not materially affecting the polyurethane system, thereby converting the polyurethane film which adheres to the fabric into a microporous polyurethane film, and (d) treating the microporous film-coated fabric with a cross-linkable silicone oil to enhance the hydrophobicity of the microporous film.

4. The method of producing a water-resistant, water vapor-permeable material which comprises (a) uniformly dispersing from about 1 to about 5 parts by weight of a solid pore-forming material having an average particle size not larger than 100 mesh (Tyler standard) in 1 part by weight of a film-forming thermoplastic polyurethane, (b) forming the resultant dispersion into a film, and (c) treating the resultant film with a liquid which is capable of dissolving the pore-forming material while not materially affecting the polyurethane system, thereby converting the polyurethane film into a microporous polyurethane film and forming a water-resistant, water vapor-permeable material.

5. The method of producing a water-resistant, water vapor-permeable material which comprises (a) uniformly dispersing from about 1 to about 5 parts by weight of a solid pore-forming material having an average particle size in the range from about 325 mesh to about 100 mesh (Tyler standard) in 1 part by weight of a film-forming thermoplastic polyurethane, (b) forming the resultant dispersion into a film having a thickness from about 0.5 to about 5 mils, and (c) treating the resultant film with a liquid which is capable of dissolving the pore-forming material while not materially affecting the polyurethane system, thereby converting the polyurethane film into a microporous polyurethane film and forming a water-resistant, water vapor-permeable material.

6. The method of producing a water-resistant, water vapor-permeable material which comprises (a) uniformly dispersing from about 1 to about 5 parts by weight of salt having an average particle size in the range from about 325 mesh to about 100 mesh (Tyler standard) in 1 part by weight of a film-forming thermoplastic polyurethane, (b) forming the resultant disperison into a film having a thickness from about 0.5 to about 5 mils, and (c) treating the resultant film with a liquid which is capable of dissolving the pore-forming material while not materially affecting the polyurethane system, thereby converting the polyurethane film into a microporous polyurethane film and forming a water-resistant, water vapor-permeable material.

7. The method of producing a water-resistant, water vapor-permeable fabric material which comprises (a) uniformly dispersing from about 1 to about 5 parts by weight of a solid pore-forming material having an average particle size not larger than 100 mesh (Tyler standard) in 1 part by weight of a film-forming thermoplastic polyurethane, (b) coating a fabric selected from the group consisting of woven and nonwoven fabrics over substantially its entire face with a thin film of the resultant polyurethane dispersion, and (c) treating the film-coated fabric with a liquid which is capable of dissolving the solid pore-forming material from the film coating while not materially affecting polyurethane system, thereby converting the polyurethane film which adheres to the fabric into a microporous polyurethane film and forming a water-resistant, water vapor-permeable fabric material.

8. The method of producing a water-resistant, water vapor-permeable fabric material which comprises (a) uniformly dispersing from about 1 to about 5 parts by weight of a solid pore-forming material having an average particle size not larger than 100 mesh (Tyler standard) in 1 part by weight of a film-forming thermoplastic polyurethane, (b) coating a fabric selected from the group consisting of woven and nonwoven fabrics over substantially its entire face with a thin film of the resultant polyurethane dispersion, (c) treating the film-coated fabric with a liquid which is capable of dissolving the solid pore-forming material from the film coating while not materially affecting the polyurethane system, thereby converting the polyurethane film which adheres to the fabric into a microporous polyurethane film, and (d) treating the microporous film-coated fabric with a hydrophobic compound to enhance the hydrophobicity of the microporous film, thereby forming a water-resistant, water vapor-permeable fabric material characterized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm.

9. The method of producing a water-resistant, water vapor-permeable fabric material which comprises (a) uniformly dispersing from about 1 to about 5 parts by weight of a solid pore-forming material having an average particle size in the range from about 325 mesh to about 100 mesh (Tyler standard) in 1 part by weight of a film-forming thermoplastic polyurethane, (b) coating a fabric selected from the group consisting of woven and nonwoven fabrics over substantially its entire face with a thin film of the resultant polyurethane dispersion, (c) treating the film-coated fabric with a liquid which is capable of dissolving the solid pore-forming material from the film coating while not materially affecting the polyurethane system, thereby converting the polyurethane film which adheres to the fabric into a microporous polyurethane film, and (d) treating the microporous film-coated fabric with a cross-linkable silicone oil to enhance the hydrophobicity of the microporous film, thereby forming a water-resistant, water vapor-permeable fabric material characterized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm.

10. The method of producing a water-resistant, water vapor-permeable fabric material which comprises (a) uniformly dispersing from about 1 to about 5 parts by weight of a solid pore-forming material having an average particle size not larger than 100 mesh (Tyler standard) in 1 part by weight of a film-forming thermoplastic polyurethane, (b) forming the resultant dispersion into a film having a thickness from about 0.5 to about 5 mils, (c) treating the resultant film with a liquid which is capable of dissolving the pore-forming material while not materially affecting the polyurethane system, thereby converting the polyurethane film into a microporous polyurethane film, and (d) laminating the microporous polyurethane film to a fabric selected from the group consisting of woven and nonwoven fabrics, thereby forming a water-resistant, water vapor-permeable fabric material.

11. The method of producing a water-resistant, water vapor-permeable fabric material which comprises (a) uniformly dispersing from about 1 to about 5 parts by weight of a solid pore-forming material having an average particle size not larger than 100 mesh (Tyler standard) in 1 part by weight of a film-forming thermoplastic polyurethane, (b) forming the resultant dispersion into a film having a thickness from about 0.5 to about 5 mils, (c) treating the resultant film with a liquid which is capable of dissolving the pore-forming material while not materially affecting the polyurethane system, thereby converting the polyurethane film into a microporous polyurethane film, (d) laminating the microporous polyurethane film to a fabric selected from the group consisting of woven and nonwoven fabrics, and (e) treating the microporous film-laminated fabric with a hydrophobic compound to enhance the hydrophobicity of the microporous film, thereby forming a water-resistant, water vapor-permeable fabric material characterized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm.

12. The method of producing a water-resistant, water vapor-permeable fabric material which comprises (a) uniformly dispersing from about 1 to about 5 parts by weight of a solid pore-forming material having an average particle size in the range from about 325 mesh to about 100 mesh (Tyler standard) in 1 part by weight of a film-forming thermoplastic polyurethane, (b) forming the resultant dispersion into a film having a thickness from about 0.5 to about 5 mils, (c) treating the resultant film with a liquid which is capable of dissolving the pore-forming material while not materially affecting the polyurethane system, thereby converting the polyurethane film into a microporous polyurethane film, (d) laminating the microporous polyurethane film to a fabric selected from the group consisting of woven and nonwoven fabrics, and (e) treating the microporous film-laminated fabric with a cross-linkable silicone oil to enhance the hydrophobicity of the microporous film, thereby forming a water resistant, water vapor-permeable fabric material characterized by (i) a Suter Test value (as measured by ASTM D 583–54–21) in the range from about 40 to about 140 cm., (ii) a Water Vapor Transmission value (as measured by ASTM E 96–53T–B) in the range from about 30 to about 100 gms./hr./m.$^2$, and (iii) an Impact Spray Test value (as measured by ASTM D 583–54–15) from 0 to 1 gm.

References Cited

UNITED STATES PATENTS

| | | | |
|---|---|---|---|
| 2,707,201 | 4/1955 | Fernald et al. | 264—49 X |
| 2,826,509 | 3/1958 | Sarbach | 117—10 |
| 2,959,822 | 11/1960 | Honey et al. | |
| 3,000,757 | 9/1961 | Johnston et al. | 117—135.5 X |
| 3,050,432 | 8/1962 | Weinbrenner et al. | |
| 3,227,603 | 1/1966 | Kraiman. | |

OTHER REFERENCES

Rochow, E. G.: Chemistry of the Silicones, New York, John Wiley & Sons (1946), pp. 83–85.

HAROLD ANSHER, Primary Examiner

R. A. KILLWORTH, Assistant Examiner

U.S. Cl. X.R.

117—63, 135.5, 161; 156—77; 260—2.5